(12) United States Patent
Lingappa et al.

(10) Patent No.: US 10,846,184 B2
(45) Date of Patent: Nov. 24, 2020

(54) SYSTEM AND METHOD TO PREDICT AND PREVENT POWER SUPPLY FAILURES BASED ON DATA CENTER ENVIRONMENTAL BEHAVIOR

(71) Applicant: DELL PRODUCTS, LP, Round Rock, TX (US)

(72) Inventors: Sunil Lingappa, Bangalore (IN); Santosh Kumar Sahu, Gondala (IN); Ajaya K. Senapati, Bangalore (IN); Vaideeswaran Ganesan, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 102 days.

(21) Appl. No.: 15/960,268

(22) Filed: Apr. 23, 2018

(65) Prior Publication Data

US 2019/0324872 A1   Oct. 24, 2019

(51) Int. Cl.
| | | |
|---|---|---|
| *G06F 11/00* | (2006.01) | |
| *G06F 11/20* | (2006.01) | |
| *G06F 1/28* | (2006.01) | |
| *G06F 1/30* | (2006.01) | |

(52) U.S. Cl.
CPC .......... *G06F 11/2015* (2013.01); *G06F 1/28* (2013.01); *G06F 1/30* (2013.01)

(58) Field of Classification Search
CPC ... G06F 1/28; G06F 1/30; G06F 1/305; G06F 11/2015; G06F 11/22; G06F 11/2257; G06F 11/3058; G06F 11/3452; G06F 11/0754; G06F 11/0706; G06F 11/008; G05B 23/0283
See application file for complete search history.

(56) References Cited

U.S. PATENT DOCUMENTS

| | | | |
|---|---|---|---|
| 5,727,928 A | 3/1998 | Brown | |
| 5,857,102 A | 1/1999 | McChesney et al. | |
| 6,567,849 B2 | 5/2003 | Ludovici et al. | |
| 6,868,444 B1 | 3/2005 | Kim et al. | |
| 7,484,132 B2 * | 1/2009 | Garbow | G06F 11/008 714/26 |
| 7,890,813 B2 * | 2/2011 | Usynin | G06F 1/30 379/106.01 |
| 7,904,734 B1 | 3/2011 | Singla et al. | |
| 7,908,505 B2 * | 3/2011 | Malik | G06F 1/28 713/300 |
| 8,140,914 B2 * | 3/2012 | Murphy | G06F 11/1461 714/47.1 |
| 8,340,933 B1 | 12/2012 | King, Jr. et al. | |
| 8,352,608 B1 | 1/2013 | Keagy et al. | |

(Continued)

*Primary Examiner* — Marc Duncan
(74) *Attorney, Agent, or Firm* — Larson Newman, LLP

(57) ABSTRACT

An information handling system may include a first power supply for a first system, a second power supply for a second system, and a management controller. The management controller may detect that the first power supply has failed, receive first information from the first system related to the operation of the first power supply prior to the failure of the first power supply, receive second information from the second system associated with the second power supply, and determine a probability of failure of the second power supply based upon a comparison of the first information with the second information.

15 Claims, 5 Drawing Sheets

(56) References Cited

U.S. PATENT DOCUMENTS

| | | | |
|---|---|---|---|
| 8,671,294 B2* | 3/2014 | Malik | G06F 1/3203 |
| | | | 713/320 |
| 8,930,736 B2* | 1/2015 | James | G06F 11/0751 |
| | | | 713/320 |
| 9,032,250 B1 | 5/2015 | Krieger et al. | |
| 9,223,394 B2* | 12/2015 | Kuan | G06F 1/3296 |
| 9,244,790 B1* | 1/2016 | Ma | G06F 11/2221 |
| 9,652,216 B2 | 3/2017 | Dharmadhikari et al. | |
| 10,152,394 B2* | 12/2018 | Demetriou | G06Q 10/0631 |
| 2007/0153443 A1 | 7/2007 | Lyons et al. | |
| 2008/0126881 A1* | 5/2008 | Bruckhaus | G06F 11/008 |
| | | | 714/47.2 |
| 2009/0206669 A1 | 8/2009 | Draeger | |
| 2010/0306357 A1 | 12/2010 | Chen | |
| 2011/0046995 A1* | 2/2011 | Nishimura | G01H 17/00 |
| | | | 705/7.12 |
| 2015/0304233 A1 | 10/2015 | Krishnamurthy et al. | |
| 2018/0120914 A1* | 5/2018 | Donlin | G06F 1/28 |
| 2018/0136288 A1* | 5/2018 | Wolfe | G06Q 10/06 |
| 2018/0174072 A1* | 6/2018 | Charles | G06N 5/02 |
| 2018/0203499 A1 | 7/2018 | Huang et al. | |
| 2018/0252777 A1 | 9/2018 | Straub | |
| 2018/0329406 A1* | 11/2018 | Bharti | G05B 23/0283 |
| 2018/0341563 A1* | 11/2018 | Chiang | G06F 1/263 |

* cited by examiner

SYSTEM AND METHOD TO PREDICT AND PREVENT POWER SUPPLY FAILURES BASED ON DATA CENTER ENVIRONMENTAL BEHAVIOR

CROSS REFERENCE TO RELATED APPLICATION

Related subject matter is contained in co-pending U.S. Patent Application No. 15/960,263 entitled "System and Method to Prevent Power Supply Failures based on Data Center Environmental Behavior," filed on Apr. 23, 2018, the disclosure of which is hereby incorporated by reference.

FIELD OF THE DISCLOSURE

This disclosure generally relates to information handling systems, and more particularly relates to a system and method to predict and prevent power supply failures based on data center environmental behavior.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a first power supply for a first system, a second power supply for a second system, and a management controller. The management controller may detect that the first power supply has failed, receive first information from the first system related to the operation of the first power supply prior to the failure of the first power supply, receive second information from the second system associated with the second power supply, and determine a probability of failure of the second power supply based upon a comparison of the first information with the second information.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
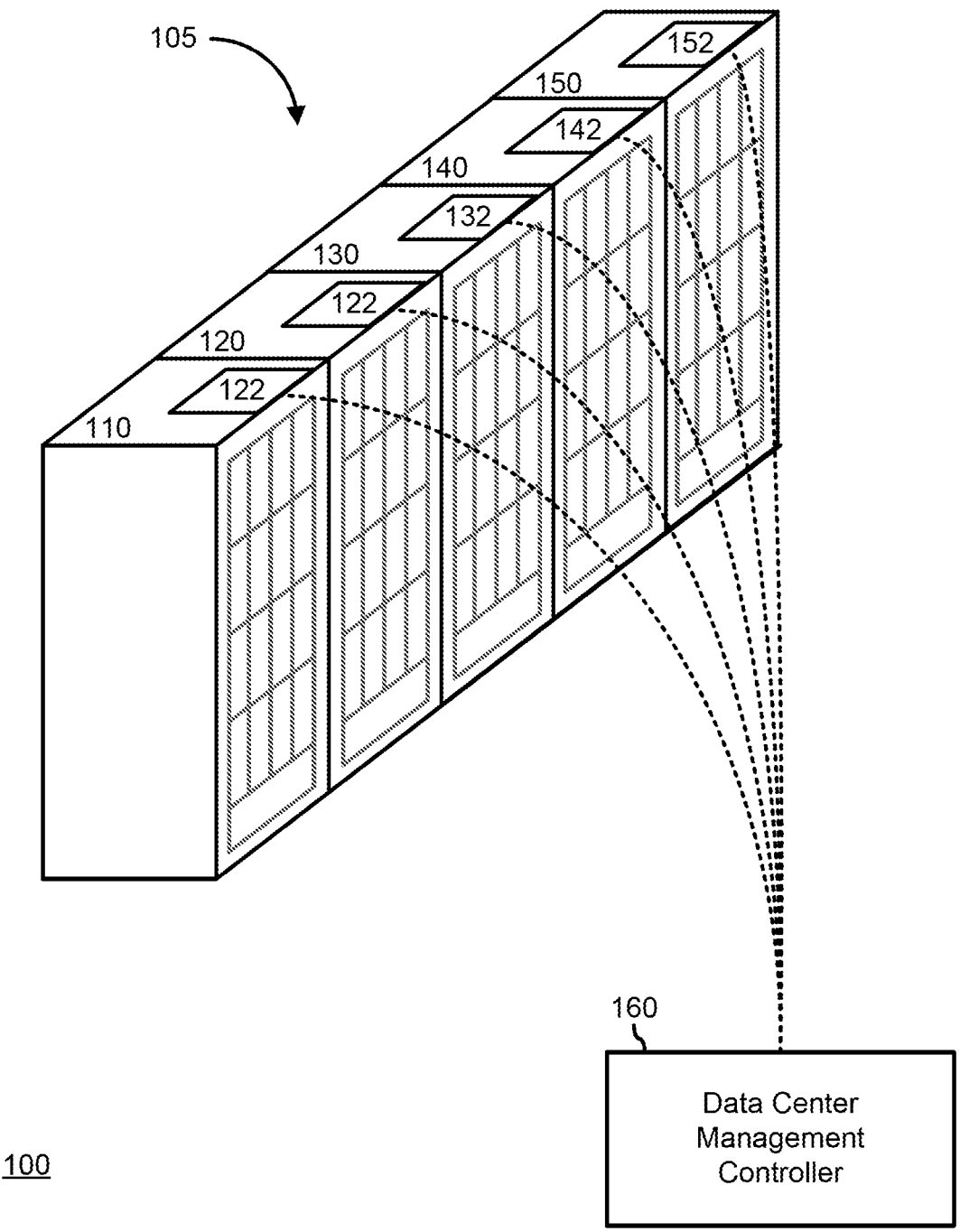
FIG. 1 is a block diagram of a data center according to an embodiment of the present disclosure.

FIG. 1 illustrates an embodiment of a data center 100 including server aisle 105, and a data center management controller (DCMC) 160. Server aisle 105 includes server racks 110, 120, 130, 140, and 150. Server racks 120, 130, 140, and 150 include various equipment that operates to perform the data storage and processing functions of data center 100. As such, one or more elements of data center 100, including the equipment in server racks 120, 130, 140, and 150 and DCMC 160 can be realized as an information handling system. Each of server racks 110, 120, 130, 140, and 150 includes a respective rack management controller (RMC) 112, 122, 132, 142, and 152. RMCs 112, 122, 132, 142, and 152 represent service processors that operate in accordance with an Intelligent Platform Management Interface (IPMI) functional implementation to provide monitoring, management, and maintenance functionality to the respective server racks 110, 120, 130, 140, and 150, and to the equipment therein. Examples of RMCs 112, 122, 132, 142, and 152 can include service processors, such as baseboard management controllers (BMCs), an Integrated Dell Remote Access Controller (iDRAC), another service processor, or a combination thereof. RMCs 112, 122, 132, 142, and 152, and DCMC 160 are connected together with various service processors associated with the equipment in server racks 110, 120, 130, 140, and 150 into a management network whereby the DCMC can remotely manage the equipment in the server racks. Server racks 110, 120, 130, 140, and 150 each include one or more power supplies to provide regulated and monitored power to the equipment within the server racks, as described further, below.

Figure 2:
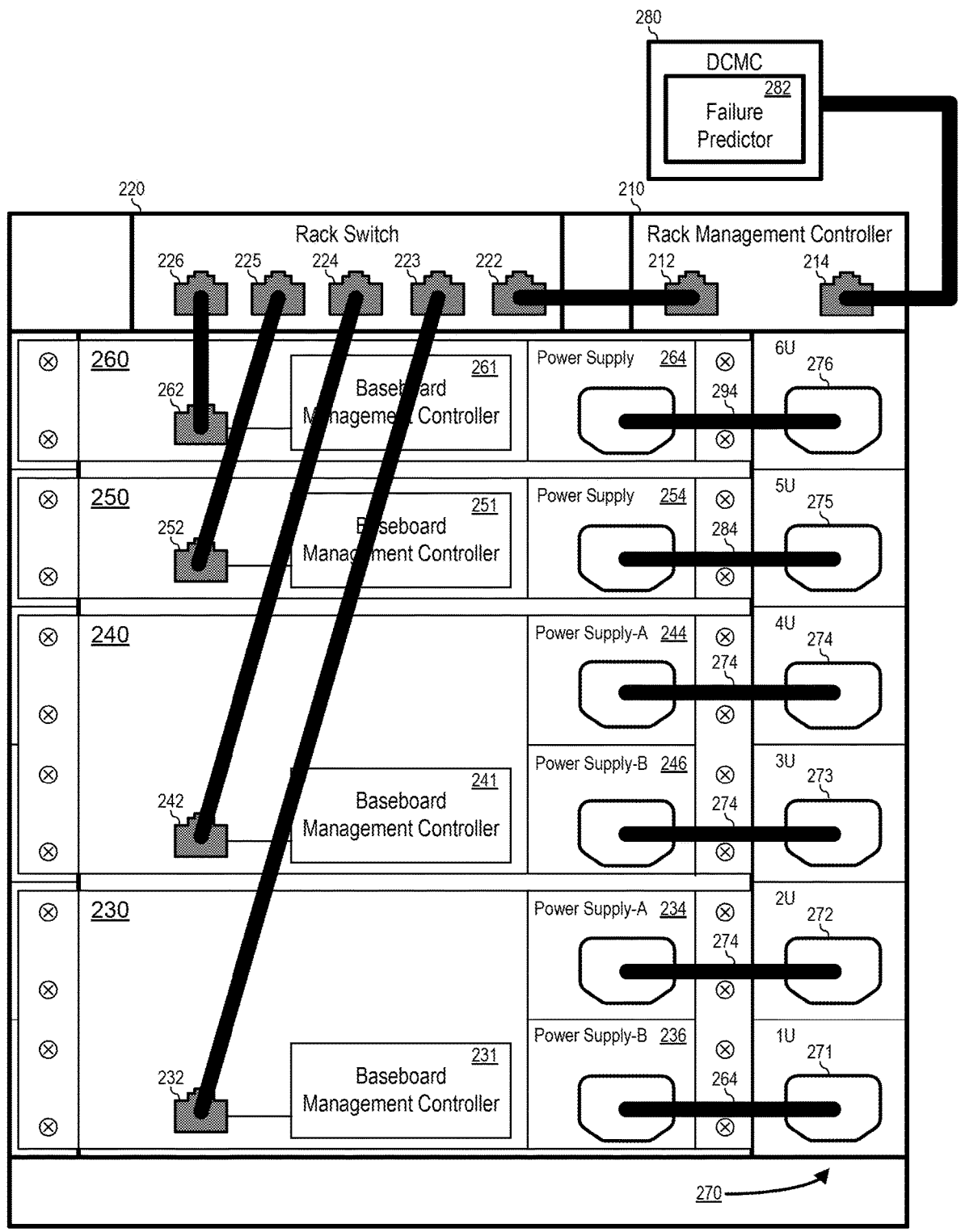
FIG. 2 is a block diagram of a server rack according to an embodiment of the present disclosure.

FIG. 2 illustrates a server rack 200 typical of server racks 110, 120, 130, 140, and 150. Server rack 200 includes a rack space that represents a standard server rack, such as a 19-inch rack equipment mounting frame or a 23-inch rack equipment mounting frame, and includes six rack units. The rack units represent special divisions of the rack space that are a standardized unit of, for example, 1.75 inches high. For example, a piece of equipment that will fit into one of the rack units shall herein be referred to as a 1-U piece of equipment, another piece of equipment that takes up two of the rack units is commonly referred to as a 2-U piece of equipment, and so forth. As such, the rack units are numbered sequentially from the bottom to the top as 1U, 2U, 3U, 4U, 5U, and 6U. The skilled artisan will recognize that other configurations for rack units can be utilized, and that a greater or lesser number of rack units in a server rack may be utilized, as needed or desired. For example, a rack unit can be defined by the Electronic Components Industry Association standards council.

Server rack 200 further includes a rack management controller 210 and a rack management switch 220, and is illustrated as being populated with two 2-U servers 230 and 240, and with two 1-U servers 250 and 260. 2-U server 230 is installed in rack spaces 1U and 2U, 2-U server 240 is installed in rack spaces 3U and 4U, 1-U server 250 is installed in rack space 5U, and 1-U server 260 is installed in rack space 6U. Rack management controller 210 includes network connections 212 and 214, and rack switch 220 includes network connections 222, 223, 224, 225, and 226. As illustrated, rack management controller 210 is connected via network connection 214 to a management network that includes a DCMC 280 similar to DCMC 160, and is connected via network connection 212 to network connection 222 of rack switch 220 to extend the management network to servers 230, 340, and 250. As such, server 230 includes a BMC 231 that is connected to network connection 223 via a network connection 232, server 240 includes a BMC 241 that is connected to network connection 224 via a network connection 242, server 250 includes a BMC 251 that is connected to network connection 225 via a network connection 252, and server 260 includes a BMC 261 that is connected to network connection 226 via a network connection 262. Here, the management network includes RMC 210, BMCs 231, 241, 251, and 261, and DCMC 280. DCMC 280 is configured to initiate management transactions with RMC 210 to monitor, manage, and maintain elements of server rack 200, of management switch 220, and of servers 230, 240, 250, and 260 via respective BMCs 321, 241, 251, and 261.

Server rack 200 further includes a power distribution unit (PDU) 270. PDU 270 operates to provide AC power to receptacles 271, 272, 273, 274, 275, and 276 from a power distribution network of data center 100. Each of receptacles 271-276 are associated with a rack unit of the server rack. Thus rack unit 1U is associated with receptacle 271, rack unit 2U is associated with receptacle 272, rack unit 3U is associated with receptacle 273, rack unit 4U is associated with receptacle 274, rack unit 5U is associated with receptacle 275, and rack unit 6U is associated with receptacle 276. Server 230 includes a pair of power supplies 234 and 236, server 240 includes a pair of power supplies 244 and 246, server 250 includes a power supply 254, and server 260 includes a power supply 264. Power supplies 234, 236, 244, 246, 254, and 264 each operate to receive AC power from the power distribution network, to convert and regulate the power from the AC voltage level to various DC voltage levels as used by respective servers 230, 240, 250, and 260, to provide operational and status information related to the power usage and health of the various DC voltage rails provided, and to provide other control and operational settings for the various DC voltage rails. Power supply 234 is connected to receive AC power from receptacle 271, power supply 236 is connected to receive AC power from receptacle 272, power supply 244 is connected to receive AC power from receptacle 273, power supply 246 is connected to receive AC power from receptacle 274, power supply 254 is connected to receive AC power from receptacle 275, and power supply 264 is connected to receive AC power from receptacle 276.

Power supplies 234 and 236 operate as redundant power supplies for server 230. That is, each of power supplies 234 and 236 are configured to provide the full operating power of server 230 without the need to operate the other power supply. As such, power supplies 234 and 236 are operated as redundant power supplies, such that when one of the power supplies fails, the other power supply is seamlessly brought on line to take over powering server 230. Thus, power supplies 234 and 236 are typically configured as hot-swappable power supplies, such that when the one power supply fails, an indication is provided to BMC 231 and a service technician can be dispatched to replace the failing power supply. Similarly, power supplies 244 and 246 are configured to provide the full operating power of server 240 without the need to operate the other power supply, and operate as redundant power supplies.

BMC 231 operates to monitor, manage, and maintain server 230. In monitoring server 230, BMC 231 accesses various sensors for monitoring various physical characteristics of the server, such as temperature sensors, fan speed sensors, voltage sensors on the various voltage rails, current sensors on the voltage rails, humidity sensors, and the like, to characterize the environmental conditions within which the server is operating. BMC 231 further accesses various state information of the elements of server 230, such as by accessing state information from power supplies 234 and 236, processor, memory, or I/O state information related to the operating condition of the elements of the server, and the like, to further characterize the environmental conditions within the elements of the server. BMC 231 further accesses various software and firmware information, such as processor loading information, memory and storage utilization information, network and I/O bandwidth information, and the like, to characterize the processing conditions of server 230. BMC 231 further operates to provide the monitoring information to RMC 210 and to DCMC 280 via the management network, as needed or desired.

In managing server 230, BMC 231 utilizes the monitoring information from the server to provide inputs to control various physical operations of the server, such as fan speeds, voltage levels, processor clock rates, I/O speeds, and the like, to ensure that the environmental conditions of the server and the elements thereof remain within acceptable limits. BMC 231 further operates to provide indications as to the environmental and processing conditions to RMC 210 and DCMC 280, as needed or desired. For example, when temperature conditions within server 230 exceed a particular threshold, then BMC 231 can provide a high-temp indication to that effect to RMC 210 and the RMC can direct a heating/ventilation/air conditioning (HVAC) system of the data center to direct additional cooling to server 230. Similarly, when temperature conditions within server 230 drop below another threshold, then BMC 231 can provide a low-temp indication to that effect to RMC 210 and the RMC can direct the HVAC system to direct less cooling to server 230.

In managing server 230, BMC 231 further utilizes the monitoring information from the server to provide inputs to control various processing conditions of the server. For example, when processing conditions, such as processor loading or memory utilization, within server 230 exceed a particular threshold, then BMC 231 can provide a high-utilization indication to that effect to DCMC 280, and the DCMC can direct spare servers of the data center to come on line to offload the workload from the server. Similarly, when processing conditions within server 230 drop below another threshold, then BMC 231 can provide a low-utilization indication to that effect to DCMC 280 and the DCMC can direct initiate steps to shut down server 230 and place it into a pool of spare servers for the data center.

In maintaining server 230, BMC 231 operates to ensure that the operating thresholds, set points, and other limits are maintained, and to reset or change the thresholds, set points and other limits as needed or desired. Further, BMC 231 operates to maintain software and firmware in server 230, as needed or desired. BMCs 241, 251, and 261 operate to monitor, manage, and maintain respective servers 240, 250, and 260 similarly to the way that BMC 231 operates on server 230, as described above. Moreover, RMC 210 operates to monitor, manage, and maintain functions and features of server rack 200, as needed or desired. Further, RMC 210 operates as a central node of the management network between BMCs 231, 241, 251, and 261, and DCMC 280, colleting monitoring information from the BMCs and providing management and maintenance information to the BMCs, as needed or desired.

DCMC 280 includes a failure predictor 282. Failure predictor 282 operates to receive the monitoring information from RMC 210 and from BMCs 231, 241, 251, and 261, to evaluate the monitoring information as it relates to past failure of the elements of server rack 200 and of servers 230, 240, 250, and 260, and to provide a prediction of the likelihood that one or more of the elements of the server rack and the servers will experience a failure. When the likelihood of a failure of the one or more elements of server rack 200 and servers 230, 240, 250, and 260 grows to great, DCMC 280 operates to provide indications of the impending failure, and to take steps to mitigate the consequences of such a failure. In general, failure predictor 282 operates to detect when a failure occurs, to log the monitoring information from RMC 210 and BMCs 231, 241, 251, and 261, to correlate the failure to particular components of the monitoring information, and to detect when the correlated components of the monitoring information is in a similar condition as existed when the failure occurred, and to provide an indication and take steps to mitigate the failure. Moreover, each time a new failure for a similar component occurs, failure predictor 282 operates to refine the prediction mechanism by more closely correlating the new failures with the particular conditions at the time of the new failures.

In a particular embodiment, failure predictor 282 operates to predict when one of power supplies 234, 236, 244, 246, 254, and 256 is likely to fail, based upon the monitoring information derived from RMC 210 and BMCs 231, 241, 251, and 261 at the time of a previous failure of one of the power supplies. For example, when a first one of power supplies 234, 236, 244, 246, 254, and 256 fails, failure predictor 282 operates to receive monitoring information from BMCs 231, 241, 251, and 261. The monitoring information includes server rack and server environmental information, processing condition information, and other monitoring information, as needed or desired. For example, failure predictor 282 can direct BMCs 231, 241, 251, and 261 and RMC 210 to provide the environmental information for servers 230 240, 250, and 260, and for server rack 200. In addition, failure predictor can direct the BMC 231, 241, 251, or 261 associated with the failing power supply to provide a make and model of the failing power supply 234, 236, 244, 246, 254, or 264, the configuration settings for the failing power supply, a predicted failure rate for the failing power supply, an age of the failing power supply when it failed, an age differential between redundant power supplies, a power usage of the failing power supply, a power source for the failing power supply, or the like, as needed or desired.

The predicted failure rate can include a rate generated by failure predictor 282 based upon historical failure rates in the data center, or can be provided by a manufacturer of the failing power supply. The age of the power supply can be in terms of a chronological age, or in terms of a watt-hour usage age of the power supply. The power usage of the failing power supply can be provided in terms of an efficiency at which the power supply converts voltages from the AC supply voltage to the various DC supply rails. For example, where a particular power supply experiences a rapid loss in efficiency, this may be a suitable indicator for the impending failure of additional power supplies. The power source for a failing power supply may be a given power bus bar of the data center. For example, a typical data center may be provided with 3-phase AC power and each phase may be utilized to power a separate bus bar, and the various power supplies of a data center may be provided with source power from different bus bars.

Once a first power supply has failed, failure predictor 282 operates to evaluate each other power supply to determine if the operating condition of the other power supplies matches the conditions present at the time of failure. In particular, failure predictor 282 can ascribe a probability to the likelihood that a particular power supply will fail as;

$$P_{fail} = f_1(\text{Hardware}) * f_2(\text{Efficiency}) * f_3(\text{Age}) * f_4(\text{Environment}) \quad \text{Eq. 1}$$

where $P_{fail}$ is the probability that a particular power supply will fail (a number between 0 and 1, with 0 indicating a low probability of failure and 1 indicating a high probability of failure), $f_1(\text{Hardware})$ is a factor that relates the make, model, and manufacturer of the evaluated power supply to the failed power supply, $f_2(\text{Efficiency})$ is a factor that relates the power usage and the power source of the evaluated power supply to the failed power supply, $f_3(\text{Age})$ is a factor that relates the age of the evaluated power supply to the failed power supply, and $f_4(\text{Environment})$ is a factor that relates the environmental conditions at the time of the failure of the failed power supply to the current environmental conditions.

An example of the hardware factor may be such that where the evaluated power supply is a same make and model as the failed power supply, the hardware factor is set to 1, where the make is the same but they are different models, the hardware factor is set to 0.5, and where they are of different makes, the hardware factor is set to 0.0 (or to a non-zero minimum, such as 0.01). An example of the efficiency may be such that when the power factor of the evaluated power supply is greater than that of the failed power supply at the time of failure, the efficiency factor is 1, and when the power factors are substantially equal, the efficiency factor is 0.50, and when the evaluated power supply has a lower power factor, then the efficiency factor is 0.25. Similarly, when the evaluated power supply is older than the failed power supply when it failed, the age factor is set to 1.0, when the evaluated power supply is substantially as old, then the age factor is set to 0.05, and when the evaluated power supply is younger, then the age factor is set to 0.10. The coefficients $f_1$, $f_2$, $f_3$, and $f_4$ are selected to provide a relative weight between the factors, such that $f_1+f_2+f_3+f_4=1$. For example, it may be determined that an increase in the power factor is most indicative of a failure, followed by age, hardware, and environment. As such $f_2$ may be set to 0.50, $f_3$ may be set to 0.25, $f_1$ may be set to 0.15, and $f_4$ may be set to 0.10.

Failure predictor 282 further operates to establish failure thresholds that provide a level based indication of the likelihood that a particular power supply will fail. For example, when $P_{aid}=0.0$-$0.3$, the likelihood of failure can be deemed to be low, indicating no action is needed, when $P_{fail}=0.3$-$0.6$, the likelihood of failure can be deemed to be medium, indicating that the power supply should be monitored, $P_{aid}=0.6$-$0.8$, the likelihood of failure can be deemed to be high, indicating that the power supply should be monitored carefully and alternatives prepared, and $P_{fail}=0.8$-$1.0$, the likelihood of failure can be deemed to be very high, indicating that failure is eminent and that action should be taken to replace the evaluated power supply.

Finally, when the evaluated power supply is a redundant power supply, such as power supplies 234 and 236, or power supplies 244 and 246, then failure predictor 282 further operates to provide a command switch active power supplies when the likelihood of failure become very high. For example, if power supply 234 has a likelihood of failure of 0.9, then failure predictor 282 can direct BMC 231 to switch power supply 234 to the standby mode and to switch power supply 236 to the active mode. Note that a failure predictor similar to failure predictor 282 can be implemented in RMC 210, or in one or more of BMCs 231, 241, 251, and 261. In this way, failures of power supplies in a data center are avoided, resulting in improved reliability and operational efficiency of the data center.

Figure 3:
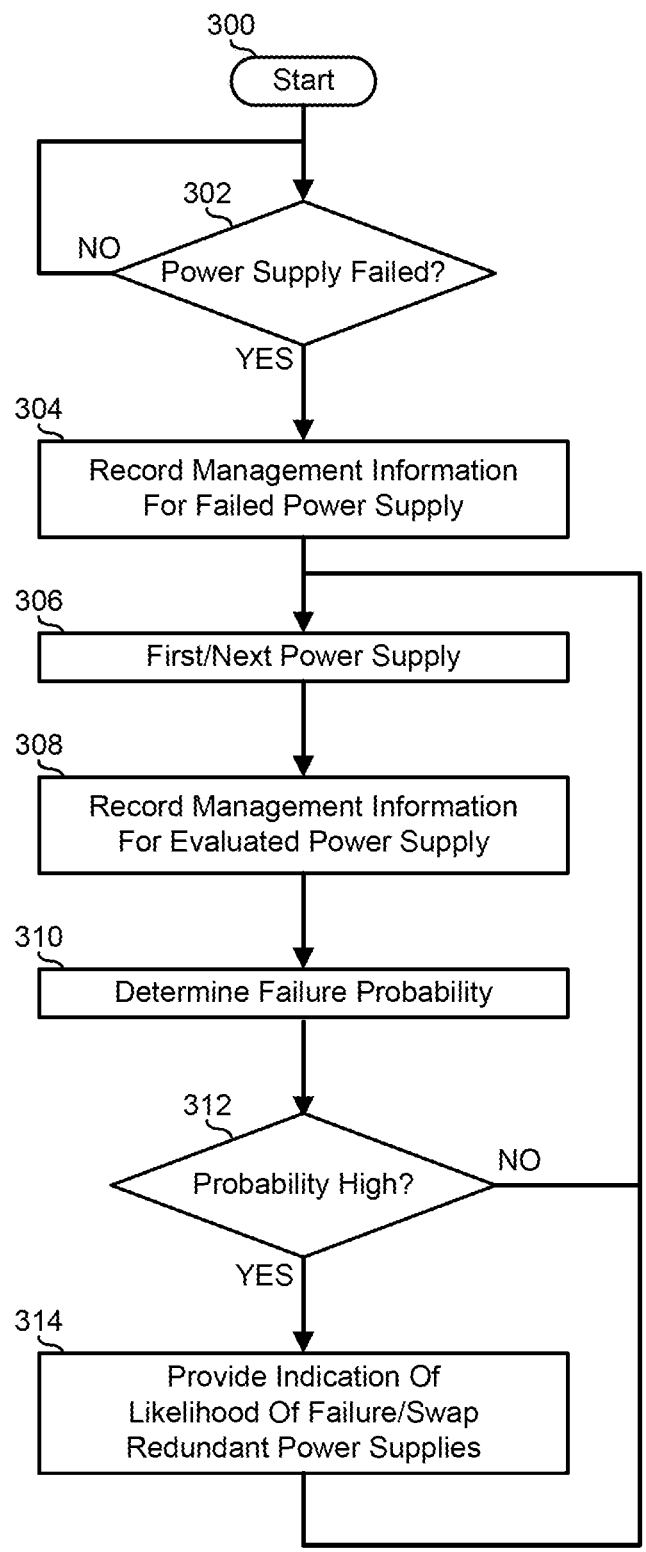
FIG. 3 is a flowchart illustrating a method for predicting power supply failures in a data center according to an embodiment of the present disclosure.

FIG. 3 illustrates a method for predicting power supply failures in a data center, starting at block 300. A decision is made as to whether a power supply in a data center has failed in decision block 302. If not, the "NO" branch of decision block 302 is taken and the method loops back to decision block 302 until a power supply in the data center has failed. When a power supply in the data center has failed, the "YES" branch of decision block 302 is taken and the management information for the data center related to the failing power supply is recorded in block 304. A first non-failing power supply is selected in block 306, and the management information for the data center related to the first non-failing power supply is recorded in block 308. A failure probability for the first non-failing power supply is determined in block 310. For example, a failure probability can be determined in accordance with Equation 1, as described above. A decision is made as to whether the failure probability for the first non-failing power supply is higher than a failure threshold in decision block 312. If not, the "NO" branch of decision block 312 is taken and the method returns to block 306 where a next non-failing power supply is selected. If the failure probability for the first non-failing power supply is higher than the failure threshold, the "YES" branch of decision block 312 is taken, an indication of the high likelihood of failure of the first non-failing power supply is given, and if the first non-failing power supply is a redundant power supply, the first non-failing power supply is swapped to the standby state and the associated redundant power supply is switched online in block 314, and the method returns to block 306 where a next non-failing power supply is selected.

In a particular embodiment, where a server, a server rack, or a data center aisle includes one or more redundant power supplies, an element of a management network, such as a BMC, a RMC, or a DCMC operates to periodically test the standby power supply to ensure that the standby power supply remains reliably ready to supply power to the server, the server rack, or the data center aisle in the event of the failure of the primary power supply. In particular, the BMC, the RMC, or the DCMC operates to switch the standby power supply into an online mode and to switch the main power supply into a standby mode. The BMC, the RMC, of the DCMC then operates to monitor the performance of the standby power supply while online to determine if the standby power supply is operating within acceptable limits, in terms of power efficiency, temperature, voltage stability, and the like. If the standby power supply is not operating within the acceptable limits, the BMC, the RMC, of the DCMC operates to switch the standby power supply back to the standby mode, to switch the main power supply back online, and to provide an indication that the standby power supply is not operating within the acceptable limits. If the standby power supply is operating within the acceptable limits, the BMC, the RMC, or the DCMC can continue to operate the standby power supply in the online mode, to designate the standby power supply as the main power supply, and to designate the main power supply as the standby power supply, or the BMC, the RMC, or the DCMC can switch the main power supply back to the online mode and switch the standby power supply back to the standby mode.

As an example of this embodiment, consider server 230 with redundant power supplies 234 and 236. Here, power supply 234 can be designated as the main power supply and power supply 236 can be designated as the standby power supply. BMC 231 determines an interval to periodically test power supply 236 to ensure that the standby power supply remains reliably ready to supply power to server 230 in the event of the failure of the power supply 234. A testing interval can be determined as:

$$\text{Interval}=f(\text{PS\_age\_differential},\text{PS\_drain})*\text{Standard Interval} \qquad \text{Eq. 2}$$

where PS_age_differential is a factor that determines the difference in age between the main power supply and the standby power supply, PS_drain is a factor that evaluates the amount of usage the standby power supply has experienced, and Standard Interval is a predetermined interval for testing standby power supplies. For example, PS_age_differential can be factored such that if the standby power supply is older than the main power supply, the Interval is reduced from the Standard Interval, and such that if the standby power supply is newer than the main power supply, the Interval is equal to the Standard Interval. Further, PS_drain can be factored such that as the power supplied by the standby power supply increases, the Interval is reduced from the Standard Interval. Finally, the Standard Interval can be selected as needed or desired, such as a one-day interval, a one week interval, a monthly interval, or the like.

When BMC 231 determines that the Interval has been reached, the BMC operates to switch power supply 236 into an online mode and to switch power supply 234 into a standby mode. BMC 231 then monitors the performance of power supply 236 while in the online mode to determine if the power supply is operating within acceptable limits, in terms of power efficiency, temperature, voltage stability, and the like. If power supply 236 is not operating within the acceptable limits, BMC 231 switches power supply 236 back to the standby mode, switches power supply 234 back into the online mode, and provides an indication via the management network that power supply 236 is not operating within the acceptable limits. If power supply 236 is operating within the acceptable limits, then BMC 231 determines whether to continue to operate power supply 236 in the online mode and swap the designation of main power supply from power supply 234 to power supply 236, or whether to switch power supply 234 back to the online mode and switch power supply 236 back to the standby mode.

Figure 4:
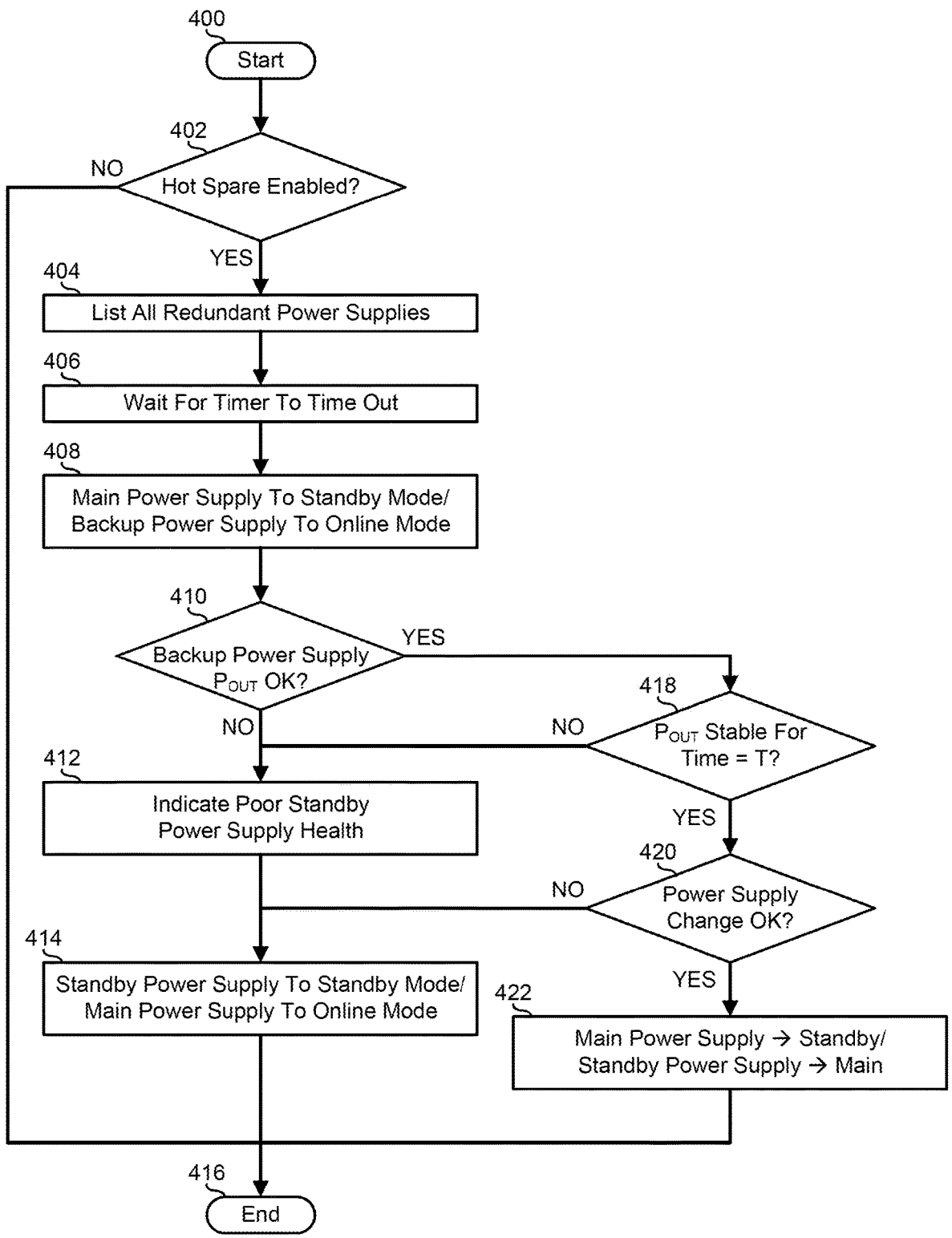
FIG. 4 is a flowchart illustrating a method for minimizing power supply failures in systems with redundant power supplies according to an embodiment of the present disclosure.

FIG. 4 illustrates a method of minimizing power supply failures in systems with redundant power supplies, starting at block 400. A decision is made as to whether power supplies in a data center are hot spare enabled in decision block 402. If not, the "NO" branch of decision block 402 is taken and the method ends in block 416. If the power supplies are hot spare enabled, the "YES" branch of decision block 402 is taken and the redundant power supplies in the data center are determined in block 404. A management controller determines an interval for testing the redundant power supplies and waits for the interval to elapse in block 406. When the interval has elapsed, the management controller switches the main power supply to the standby mode and switches the standby power supply to the online mode in block 408.

A decision is made as to whether the power output from the standby power supply is good in decision block 410. If not, the "NO" branch of decision block 410 is taken and an indication is provided by the management controller that the standby power supply is exhibiting poor health in block 412. The management controller switches the main power supply to the online mode and switches the standby power supply to the standby mode in block 414 and the method ends in block 416. Returning to decision block 410, if the power output from the standby power supply is good, the "YES" branch is taken and a decision is made as to whether the power output from the standby power supply remains stable for a test duration (T) in decision block 418. If not, the "NO" branch of decision block 418 is taken, and an indication is provided by the management controller that the standby power supply is exhibiting poor health in block 412. An example of the test duration (T) can be based upon an amount of time needed by the standby power supply to stabilize operations after being switched to the online mode, such as one (1) second, five (5) seconds, ten (10) seconds, or the like, as needed or desired. The management controller switches the main power supply to the online mode and switches the standby power supply to the standby mode in block 414 and the method ends in block 416.

Returning to decision block 418, if the power output from the standby power supply remains stable for the test duration (T), the "YES" branch is taken and a decision is made as to whether changes to the power supply sources is permissible in decision block 420. For example, where both the main and the standby power supplies are powered by a common bus bar, it may be advisable to swap the standby power supply into the roll of main power supply in order to evenly utilize the pair of power supplies. On the other hand, where the main and standby power supplies are powered by different bus bars, it may be advisable to retain the original designations due to bus bar loading concerns. If changes to the power supply sources are not permissible, the "NO" branch of decision block 420 is taken, the management controller switches the main power supply to the online mode and switches the standby power supply to the standby mode in block 414, and the method ends in block 416. If changes to the power supply sources are permissible, the "YES" branch of decision block 420 is taken, the main power supply is designated as the standby power supply and the standby power supply is designated as the main power supply in block 422, and the method ends in block 416.

Figure 5:
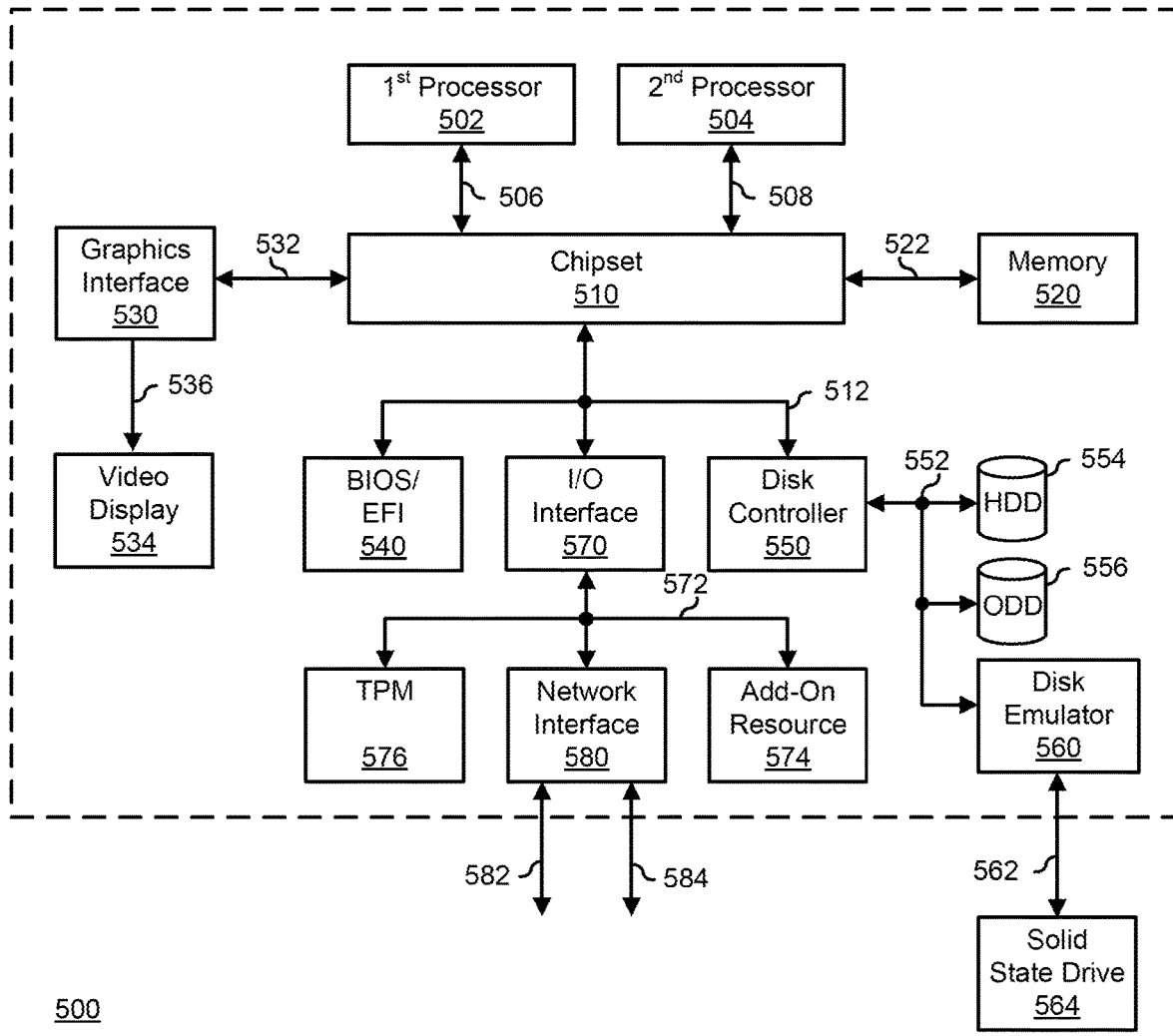
FIG. 5 is a block diagram illustrating a generalized information handling system according to an embodiment of the present disclosure.

FIG. 5 illustrates a generalized embodiment of information handling system 500. For purpose of this disclosure information handling system 500 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 500 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 500 can include processing resources for executing machine-executable code, such as a central processing unit (CPU), a programmable logic array (PLA), an embedded device such as a System-on-a-Chip (SoC), or other control logic hardware. Information handling system 500 can also include one or more computer-readable medium for storing machine-executable code, such as software or data. Additional components of information handling system 500 can include one or more storage devices that can store machine-executable code, one or more communications ports for communicating with external devices, and various input and output (I/O) devices, such as a keyboard, a mouse, and a video display. Information handling system 500 can also include one or more buses operable to transmit information between the various hardware components.

Information handling system 500 can include devices or modules that embody one or more of the devices or modules described above, and operates to perform one or more of the methods described above. Information handling system 500 includes a processors 502 and 504, a chipset 510, a memory 520, a graphics interface 530, include a basic input and output system/extensible firmware interface (BIOS/EFI) module 540, a disk controller 550, a disk emulator 560, an input/output (I/O) interface 570, and a network interface 580. Processor 502 is connected to chipset 510 via processor interface 506, and processor 504 is connected to the chipset via processor interface 508. Memory 520 is connected to chipset 510 via a memory bus 522. Graphics interface 530 is connected to chipset 510 via a graphics interface 532, and provides a video display output 536 to a video display 534. In a particular embodiment, information handling system 500 includes separate memories that are dedicated to each of processors 502 and 504 via separate memory interfaces. An example of memory 520 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 540, disk controller 550, and I/O interface 570 are connected to chipset 510 via an I/O channel 512. An example of I/O channel 512 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 510 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 540 includes BIOS/EFI code operable to detect resources within information handling system 500, to provide drivers for the resources, initialize the resources, and access the resources. BIOS/EFI module 540 includes code that operates to detect resources within information handling system 500, to provide drivers for the resources, to initialize the resources, and to access the resources.

Disk controller 550 includes a disk interface 552 that connects the disc controller to a hard disk drive (HDD) 554, to an optical disk drive (ODD) 556, and to disk emulator 560. An example of disk interface 552 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 560 permits a solid-state drive 564 to be connected to information handling system 500 via an external interface 562. An example of external interface 562 includes a USB interface, an IEEE 1394 (Firewire) interface, a proprietary interface, or a combination thereof. Alternatively, solid-state drive 564 can be disposed within information handling system 500.

I/O interface 570 includes a peripheral interface 572 that connects the I/O interface to an add-on resource 574, to a TPM 576, and to network interface 580. Peripheral interface 572 can be the same type of interface as I/O channel 512, or can be a different type of interface. As such, I/O interface 570 extends the capacity of I/O channel 512 when peripheral interface 572 and the I/O channel are of the same type, and the I/O interface translates information from a format suitable to the I/O channel to a format suitable to the peripheral channel 572 when they are of a different type. Add-on resource 574 can include a data storage system, an additional graphics interface, a network interface card (NIC), a sound/video processing card, another add-on resource, or a combination thereof. Add-on resource 574 can be on a main circuit board, on separate circuit board or add-in card disposed within information handling system 500, a device that is external to the information handling system, or a combination thereof.

Network interface 580 represents a NIC disposed within information handling system 500, on a main circuit board of the information handling system, integrated onto another component such as chipset 510, in another suitable location, or a combination thereof. Network interface device 580 includes network channels 582 and 584 that provide interfaces to devices that are external to information handling system 500. In a particular embodiment, network channels 582 and 584 are of a different type than peripheral channel 572 and network interface 580 translates information from a format suitable to the peripheral channel to a format suitable to external devices. An example of network channels 582 and 584 includes InfiniBand channels, Fibre Channel channels, Gigabit Ethernet channels, proprietary channel architectures, or a combination thereof. Network channels 582 and 584 can be connected to external network resources (not illustrated). The network resource can include another information handling system, a data storage system, another network, a grid management system, another suitable resource, or a combination thereof.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a processor or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system, comprising:
a first power supply for a first system;
a second power supply for a second system; and'
a management controller configured to:

detect that the first power supply has failed;
receive first information from the first system related to an operating condition of a first processing element of the first system prior to the failure of the first power supply, wherein the operating condition of the first processing element includes an operating condition of software or firmware operating on the first system;
receive second information from the second system related to an operating condition of a second processing element of the second system; and
determine a probability of failure of the second power supply based upon a comparison of the first information with the second information, wherein the probability of failure is determined as:

$$P_{fail} = f_1(HW) * f_2(Eff) * f_3(Age) * f_4(Env)$$

where $f_1(HW)$ represents a factor that relates first hardware information for the first power supply to second hardware information for the second power supply, $f_2(Eff)$ represents a factor that relates first efficiency information for the first power supply at the time of failure to second efficiency information for the second power supply, $f_3(Age)$ represents a factor that relates first age information of the first power supply at the time of failure to second age information of the second power supply, and $f_4(Env)$ represents a factor that relates first environmental information for a physical environment of the first power supply at the time of failure to second environmental information for a physical environment of the second power supply.

2. The information handling system of claim 1, wherein the management controller is further configured to:
determine that the probability of failure is greater than a threshold.

3. The information handling system of claim 2, wherein the management controller is further configured to:
provide an indication when the probability of failure is greater than the threshold.

4. The information handling system of claim 3, further comprising:
a third power supply for the second system, the third power supply operating as a backup to the second power supply;
wherein the management controller is further configured to direct the second system to disable the second power supply and to enable the third power supply when the probability of failure is greater than the threshold.

5. The information handling system of claim 1, wherein the first information includes the first hardware information, the first efficiency information, the first age information, and the first environmental information.

6. The information handling system of claim 1, wherein the operating condition of the first processing element further includes at least one of a processor loading for the first system, a memory utilization for the first system, a storage utilization for the first system, a network bandwidth for the first system, and a input/output bandwidth for the first system.

7. A method, comprising:
detecting, by a management controller, that a first power supply for a first system has failed;
receiving first information from the first system related to an operating condition of a first processing element of the first system prior to the failure of the first power supply;
receiving second information from a second system that includes a second power supply, the second information related to an operating condition of a second processing element of the second system, wherein the operating condition of the first processing element includes an operating condition of software or firmware operating on the first system; and
determining a probability of failure of the second power supply based upon a comparison of the first information with the second information, wherein the probability of failure is determined as:

$$P_{fail} = f_1(HW) * f_2(Eff) * f_3(Age) * f_4(Env)$$

where $f_1(HW)$ represents a factor that relates first hardware information for the first power supply to second hardware information for the second power supply, $f_2(Eff)$ represents a factor that relates first efficiency information for the first power supply at the time of failure to second efficiency information for the second power supply, $f_3(Age)$ represents a factor that relates first age information of the first power supply at the time of failure to second age information of the second power supply, and $f_4(Env)$ represents a factor that relates first environmental information for a physical environment of the first power supply at the time of failure to second environmental information for a physical environment of the second power supply.

8. The method of claim 7, further comprising:
determining that the probability of failure is greater than a threshold.

9. The method of claim 8, further comprising:
providing an indication when the probability of failure is greater than the threshold.

10. The method of claim 9, further comprising:
directing the second system to disable the second power supply and to enable a third power supply of the second system when the probability of failure is greater than the threshold, the third power supply operating as a backup to the second power supply.

11. The method of claim 7, wherein the first information includes the first hardware information, the first efficiency information, the first age information, and the first environmental information.

12. The method of claim 7, wherein the operating condition of the first processing element further includes at least one of a processor loading for the first system, a memory utilization for the first system, a storage utilization for the first system, a network bandwidth for the first system, and a input/output bandwidth for the first system.

13. An information handling system, comprising:
for a first system;
a second power supply for a second system;
a third power supply for the second system, the third power supply operating as a backup to the second power supply; and
a management controller configured to:
detect that the first power supply has failed;
receive first information from the first system related to an operating condition of a first processing element of the first system prior to the failure of the first power supply, wherein the operating condition of the first processing element includes an operating condition of software or firmware operating on the first system;

receive second information from the second system related to an operating condition of a second processing element of the second system;

determine a probability of failure of the second power supply based upon a comparison of the first information with the second information, wherein the probability of failure is determined as:

$$P_{fail} = f_1(HW) * f_2(Eff) * f_3(Age) * f_4(Env)$$

where $f_1(HW)$ represents a factor that relates first hardware information for the first power supply to second hardware information for the second power supply, $f_2(Eff)$ represents a factor that relates first efficiency information for the first power supply at the time of failure to second efficiency information for the second power supply, $f_3(Age)$ represents a factor that relates first age information of the first power supply at the time of failure to second age information of the second power supply, and $f_4(Env)$ represents a factor that relates first environmental information for a physical environment of the first power supply at the time of failure to second environmental information for a physical environment of the second power supply; and direct the second system to disable the second power supply and to enable the third power supply when the probability of failure is greater than a threshold.

14. The information handling system of claim 13, wherein the first information includes the first hardware information, the first efficiency information, the first age information, and the first environmental information.

15. The information handling system of claim 13, wherein the operating condition of the first processing element further includes at least one of a processor loading for the first system, a memory utilization for the first system, a storage utilization for the first system, a network bandwidth for the first system, and a input/output bandwidth for the first system.

\* \* \* \* \*